United States Patent [19]

Lew

[11] Patent Number: 4,733,579

[45] Date of Patent: Mar. 29, 1988

[54] ORBITING RING-GEAR PLANETARY DRIVE

[76] Inventor: Hyok S. Lew, 7890 Oak St., Arvada, Colo. 80005

[21] Appl. No.: 891,124

[22] Filed: Jul. 31, 1986

Related U.S. Application Data

[63] Continuation-in-part of Ser. No. 750,787, Jul. 1, 1985, abandoned, which is a continuation-in-part of Ser. No. 747,889, Jun. 24, 1985, abandoned.

[51] Int. Cl.$^4$ .................... F16H 1/28; F16H 57/10
[52] U.S. Cl. ................................ 74/804; 74/803; 74/766
[58] Field of Search ............. 74/766, 781 R, 803, 74/804

[56] References Cited

U.S. PATENT DOCUMENTS

| | | | |
|---|---|---|---|
| 1,009,954 | 11/1911 | de Briones | 74/766 X |
| 2,108,384 | 2/1938 | Moisy | 74/804 |
| 2,667,089 | 1/1954 | Gregory | 74/804 X |
| 2,972,910 | 2/1961 | Menge, Sr. | 74/804 |
| 4,189,962 | 2/1980 | Chung | 74/766 X |
| 4,379,976 | 4/1983 | Pitchford et al. | 74/804 X |

FOREIGN PATENT DOCUMENTS

| | | | |
|---|---|---|---|
| 1317151 | 12/1926 | France | 74/804 |
| 988945 | 4/1965 | United Kingdom | 74/804 |

Primary Examiner—Dirk Wright

[57] ABSTRACT

An ultra-compact planetary drive provides a high reduction ratio and high power transmission without sacrificing the transmission efficiency. The compactness and versatility of the present invention is achieved by using an orbiting ring gear instead of the orbiting spur gears traditionally employed in the construction of the conventional planetary gear drive. The planetary drive of the present invention may be constructed by using gears on friction rollers or combination of gears and friction rollers.

6 Claims, 10 Drawing Figures

4,733,579

ORBITING RING-GEAR PLANETARY DRIVE

BACKGROUND OF THE INVENTION

This is a continuation-in-part application Ser. No. 750,787 now abandoned entitled "Differential Gear Clutch" filed on July 1, 1985 as a continuation-in-part application to patent application Ser. No. 747,889 now abandoned entitled "Quasi-In-Line Speed Reducer" filed on June 24, 1985.

Although the planetary speed reducer is the best in terms of high reduction and high torque capacity, it is usually quite bulky and expensive. Recently, there has emerged a compact speed reducer with a high reduction ratio known as the "harmonic drive" or "cyclo speed reducer". The compactness of these speed reducers results from "in-line" configuration wherein all rotating elements have a nearly common rotating axis. Although these types of speed reducer have succeeded in reducing the bulk and weight while they provide a high reduction ratio, they have a serious short-coming in that they have a rather limited torque capacity and require a great deal of precision in manufacturing. In spite of a great demand in the industry, a truly compact and powerful speed reducer providing a high reduction ratio that is economically priced does not exist at the present time.

SUMMARY OF THE INVENTION

The primary object of the present invention is to provide a planetary drive with a high reduction ratio and high torque capacity, that is compact, durable and inexpensive.

Another object is to provide a planetary drive with all rotating elements having a nearly common axis of rotation.

A further object is to provide a planetary drive employing an orbiting gear or a friction drive ring instead of the orbiting spur gear commonly employed in all conventional planetary gear reducers.

Yet another object is to provide a planetary drive with a built-in clutch.

Yet a further object is to provide a variable speed planetary drive with a built-in clutch.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENT

Figure 1:
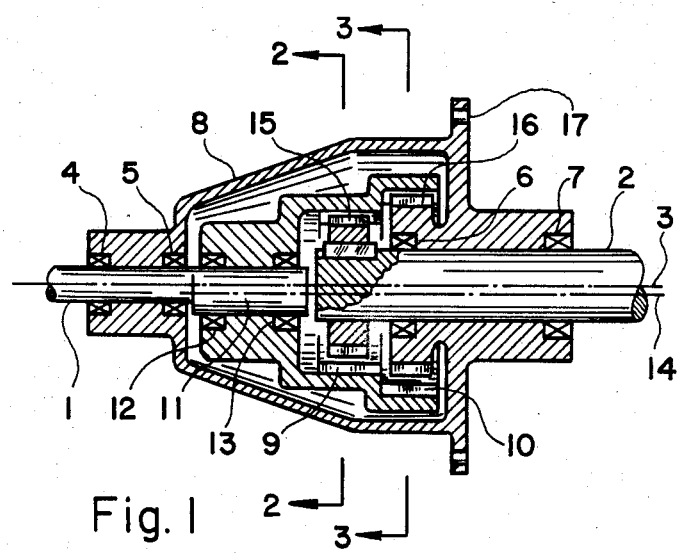
FIG. 1 illustrates a cross section of an orbiting ring-gear planetary drive constructed in accordance with the principles of the present invention.

In FIG. 1 there is illustrated a cross section of an embodiment of the orbiting ring-gear planetary drive constructed in accordance with the principles of the present invention, which cross section is taken along a plane including the common central axis of the input and output shafts. The orbiting ring-gear planetary drive shown in FIG. 1 comprises a first shaft 1 and a second shaft 2 having a common central axis 3, which shafts are rotatably supported by bearings 4 and 5, and 6 and 7 affixed to the housing 8, respectively. The first shaft 1 includes a pair of internal ring-gears 9 and 10 coaxially and rigidly coupled to one another. The combination of the ring-gears 9 and 10 is rotatably mounted on an eccentric extension 11 of the first shaft 1 by means of the bearings 12 and 13, wherein the combination of the ring-gears 9 and 10 is allowed to rotate about its own central axis 14 while it orbits about the central axis 3 when the first shaft rotates. The first internal ring-gear 9 is engaged by a first external gear 15 nonrotatably mounted on the second shaft 2 and disposed within the first internal ring-gear 9 in an eccentric relationship. The second internal ring gear 10 is engaged by a second external gear 16 disposed coaxially with respect to the second shaft 2 and rigidly affixed to the housing 8, wherein it is disposed within the second internal ring-gear 10 in an eccentric relationship. The first and second internal ring-gears have different pitch diameters from one another and, consequently, the first and second external gears 15 and 16 have different pitch diameters from one another. The housing 8 may be held nonrotatably in position by the flange 17 with bolt holes that is anchored to a stationary structure.

Figure 2:
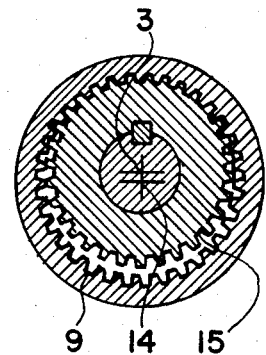
FIG. 2 illustrates another cross section of the apparatus shown in FIG. 1.
Figure 3:
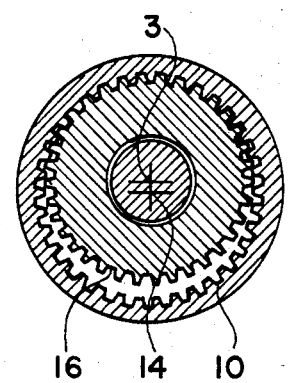
FIG. 3 illustrates a further cross section of the apparatus shown in FIG. 1.

In FIGS. 2 and 3, there are shown cross sections of the apparatus illustrated in FIG. 1 respectively taken along planes 2—2 and 3—3, as shown in FIG. 1. The rotation of the first shaft 1 about its central axis 3 generates an orbiting motion of the central axis 14 of the combination of the internal ring-gears 9 and 10. As the second external gear 16 is nonrotatably anchored to the stationary housing 8, the second internal ring-gear 10 experiences a rotating motion about its own axis 4 while it orbits about the common central axis 3 of the input and output shafts 1 and 2. Since the pitch diameter of the first external gear 15 is different from that of the second external gear 16, the rotating motion of the first internal ring-gear 9 produces a rotating motion of the first external gear 15. As a consequence, the rotating motion of the first shaft 1 is transmitted to the second shaft 2. It is clear that, when the diameters of the first and second internal ring gears as well as the diameters of the first and second external ring gears are the same, the second shaft 2 remains stationary independent of the rotating speed of the first shaft 1.

It can be easily shown that the ratio of the angular velocity or rate of rotation $\Omega_2$ of the second shaft 2 to that of the first shaft 1 $\Omega_1$ is given by the equation $$\frac{\Omega_2}{\Omega_1} = \frac{R}{D_1 D_2} (D_2 - D_1),$$

where $D_1$ and $D_2$ are the pitch diameters of the first and second external gears 15 and 16 respectively, and R is the off-set distance between the central axes 3 and 14. It is readily recognized from this equation that a very high reduction can be obtained when $D_1$ and $D_2$ are close to each other. The direction of rotation of the second shaft 2 with respect to that of the shaft 1 can be reversed by employing the ratio $D_1/D_2$ greater or less than one.

The novelty and ingenuity of the present invention as shown in FIG. 1 originates from two accomplishments: firstly, the orbiting ring-gear planetary drive provides an unlimited reduction ratio without relying on any worm gear mechanism or the like accompanying rubbing motions and, consequently, provides a high reduction gear drive with high mechanical transmission efficiency. Secondly, the employment of the orbiting internal ring-gear provides a much more compact construction compared with the conventional planetary drive employing orbiting external spur gears and, consequently, the orbiting ring-gear planetary drive provides a high torque capacity gear reducer with high reduction ratio that is much more compact and light weight compared with conventional planetary gear reducers. It should be understood that the power take off shaft of an engine or of a motor may be coupled to the first shaft 1 directly or by a prestage gear reducer.

Figure 4:
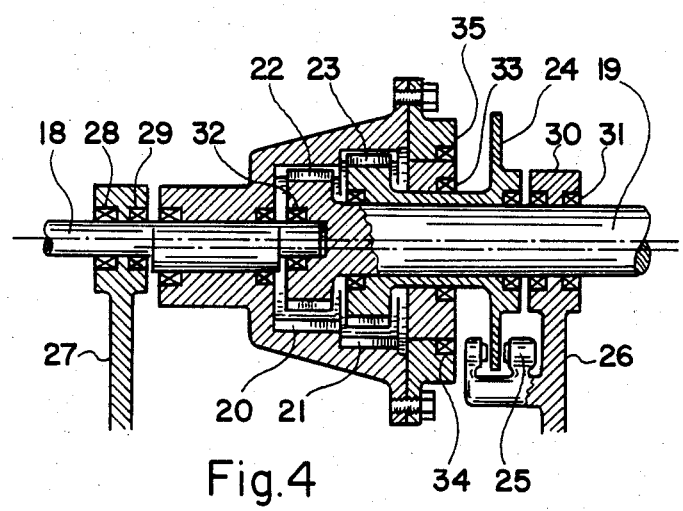
FIG. 4 illustrates an embodiment of the orbiting ring-gear planetary drive with a built-in clutch.

In FIG. 4 there is illustrated a cross section of an embodiment of an orbiting ring-gear planetary drive with a built in clutch. The first shaft 18, the second shaft 19, the combination of the internal ring gears 20 and 21, and the external gears 22 and 23 are assembled in the same arrangements as the corresponding elements illustrated in and described in conjunction with FIG. 1. In place of the housing 8 shown in FIG. 1, a braking means comprising of brake disc 24 and brake actuator 25 is included, which is supported by a frame structure including the bearing holders 26 and 27 respectively housing the bearings 28 and 29, 30 and 31 rotatably supporting the shafts 18 and 19. The combination of the second external gear 23 and the brake disc rigidly connected to one another is rotatably mounted on the second shaft 19. Additional bearings 32 and 33 supporting the two shafts 18 and 19 rotatably about their common axis and the bearing 34 supporting the combination of the internal ring-gear 20 and 21 rotatably about the central axis of the internal ring-gears are employed for a more rigid and stronger assembly of the rotating elements. It should be noticed that the flange 35 rotatably supported by the bearing 34 is rigidly affixed to the combination of the internal ring-gears 20 and 21.

When the brake means comprising of elements 24 and 25 is deactivated, the second external gear 23 is allowed to rotate freely. As a consequence, all of the rotating motion of the first shaft 18 is transmitted to the second external gear 23 and, consequently, the first shaft 18 does not transmitt any torque or power to the second shaft 19. When the brake means is activated, the second external gear 23 is not allowed to rotate and, consequently, all the torque and power on the first shaft 18 is transmitted to the second shaft 19. It is clear that the brake means comprising of the brake disc 24 and actuator 25 plays the role of clutch. By activating and deactivating the brake means gradually or in a controlled fashion, one can operate the orbiting ring-gear planetary drive shown in FIG. 4 as an infinitely variable speed drive during the transition period of starting or stopping.

Figure 5:
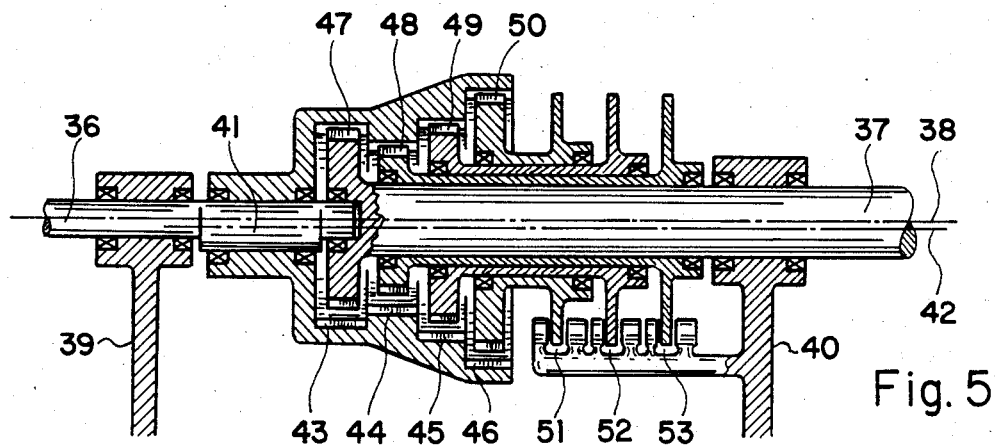
FIG. 5 illustrates a variable speed orbiting ring-gear planetary drive constructed in accordance with the principles of the present invention.

In FIG. 5 there is illustrated a cross section of a variable speed drive version of an orbiting ring-gear planetary drive constructed in accordance with the principles of the present invention. The first shaft 36 and the second shaft 37 having a common central axis 38 is rotatably supported by the frame structures 39 and 40 in an assembly similar to that shown in and described with FIG. 4. The eccentric extension 41 of the first shaft 36 with a central axis 42 off-set from the common axis 38, rotatably supports a rigid combination of the internal ring-gears 43, 44, 45, 46, etc., which combination is allowed to rotate about the axis 42 while it orbits about the common axis 38 when the first shaft 36 rotates. The first external gear 47 nonrotatably mounted on the second shaft 37 is disposed within the first internal ring-gear 43 and engages the first internal ring-gear 43. A plurality of external gears 48, 49, 50, etc., including brake means 51, 52, 53, and rotatably mounted on the second shaft 37 are respectively disposed within and engage the internal ring-gears 44, 45, 46, etc. When all of the brake means 51, 52, 53, etc., are disengaged, the first shaft 36 does not transmit any torque or power to the second shaft 37. When only one of the brake means 51, 52, 53, is engaged, the first shaft 36 transmits torque and power to the second shaft 37 at a reduction ratio determined by the combination of the external gear 47 and the particular external gear being braked in accordance with the equation described in conjunction with FIGS. 1, 2 and 3. In the particular embodiment shown in FIG. 5, braking of the external gear 48 results in a reverse rotation of the second shaft 37, while braking of the external gears 49 or 50 one at a time results in a forward rotation at two different speeds.

Figure 6:
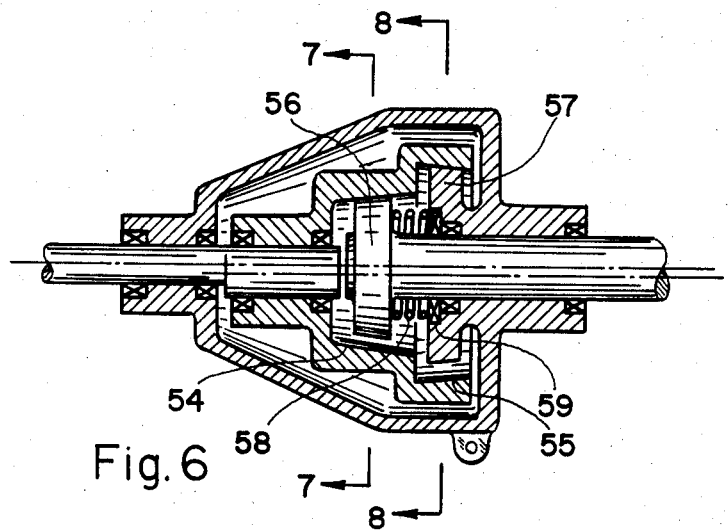
FIG. 6 illustrates a cross section of an embodiment of the orbiting friction-ring planetary drive.

In FIG. 6 there is illustrated an embodiment of a friction drive constructed in accordance with the principles of the present invention. This orbiting friction-ring planetary drive includes essentially the same elements arranged in the same assembly as those shown in FIG. 1 with one exception being that the transmission of the rotating motion between the rotating elements is now provided by friction instead of the gear teeth. Naturally, the combination of the internal ring-gears 9 and 10 is now replaced by the rigid and coaxial combination of the internal friction-rings 54 and 55, while the external ring-gears 15 and 16 are respectively replaced by the external friction rollers 56 and 57. In this particular embodiment, the surfaces of the rotating elements under a frictional contact is tapered in two opposite directions whereby the frictional contacts between the elements 54 and 56, and between the elements 55 and 57 are simultaneously spring biased by a single spring 58 disposed on the periphery of the second shaft and resting on a thrust bearing 59. The reduction ratio is determined by the same equation as that described in conjunction with FIGS. 1, 2 and 3, wherein $D_1$ and $D_2$ now designate the mean diameter of the external friction rollers 56 and 57, respectively.

Figure 7:
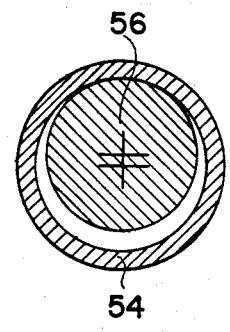
FIG. 7 illustrates another cross section of the apparatus shown in FIG. 6.
Figure 8:
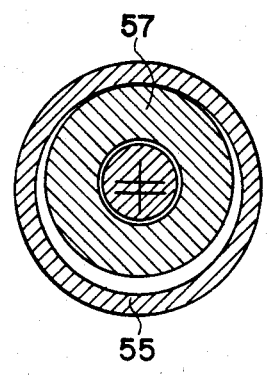
FIG. 8 illustrates a further cross section of the apparatus shown in FIG. 7.

FIG. 7 and FIG. 8 respectively designate the cross sections of the apparatus shown in FIG. 6, which are taken along planes 7—7 and 8—8 as shown in FIG. 6.

Figure 9:
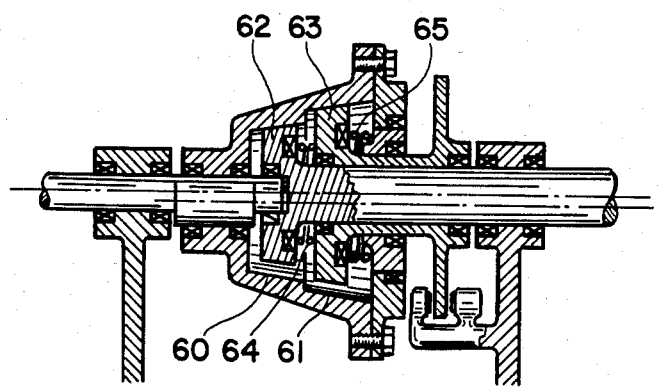
FIG. 9 illustrates an embodiment of the orbiting friction-ring planetary drive with a built-in clutch.

In FIG. 9 there is illustrated an embodiment of the orbiting friction-ring planetary drive having essentially the same elements and construction as apparatus shown in FIG. 4 wherein the internal ring-gears 20 and 21 are now replaced by the internal friction rings 60 and 61, respectively, and the external gears 22 and 23 are now replaced by the external friction rollers 62 and 63, respectively. The rotational surfaces under a frictional contact are tapered in the same direction for all surfaces in this particular embodiment, which are spring biased by a pair of springs 64 and 65. In this particular arrangement, the spring 65 must provide a stronger biasing force than the spring 64.

Figure 10:
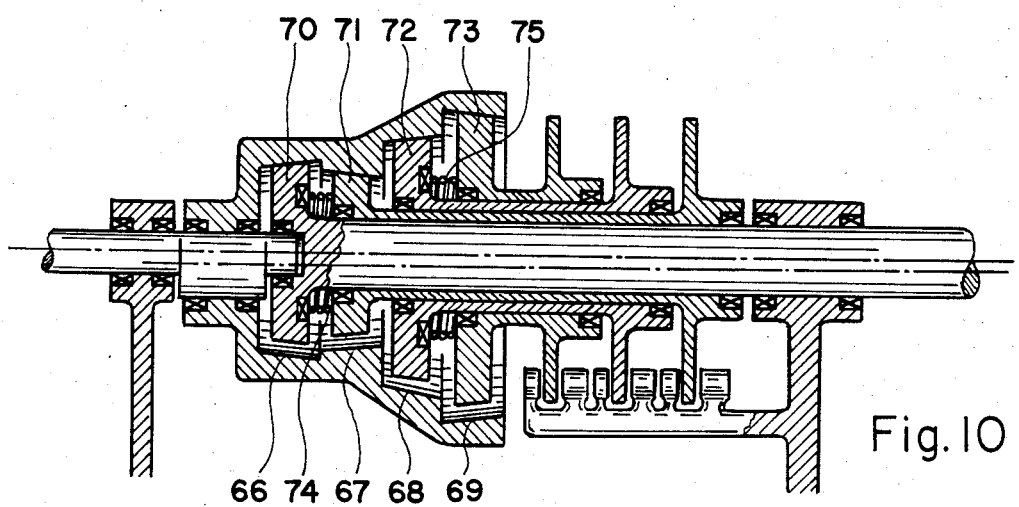
FIG. 10 illustrates an embodiment of a variable speed orbiting friction-ring planetary drive.

In FIG. 10 there is illustrated a variable speed drive version of the orbiting friction-ring planetary drive, that has essentially the same elements and arrangements as the apparatus shown in FIG. 5 wherein the internal ring-gears 43, 44, 45, 46, etc., are now replaced by the internal friction-rings 66, 67, 68, 69, etc., and the external gears 47, 48, 49, 50, etc., are now replaced by the external friction rollers 70, 71, 72, 73, etc. The adjacent pair of rotating elements have the rotating surfaces under a frictional contact which are tapered in opposite directions, whereby four sets of the rotating surfaces are balanced by a pair of springs 74 and 75. The orbiting friction-ring planetary drive operates on the same principles as the correspondng orbiting ring-gear planetary drive.

While the principles of the invention have now been made clear by the illustrative embodiments, there will be immediately obvious to those skilled in the art many modifications of the structures, elements, arrangements, proportions and materials which are particularly adapted to the specific working environments and operating conditions in the practice of the invention without departing from those principles. It is not desired to limit the invention to the illustrative embodiments shown and described and, accordingly, all suitable modifications and equivalents may be resorted to falling within the scope of the invention as defined by the claims which follow.

The embodiments of the invention in which an exclusive property or privilege is claimed are defined as follows:

1. An apparatus for transmitting power comprising in combination:
   (a) a first shaft rotatably and coaxially disposed about a first axis;
   (b) a second shaft rotatably and coaxially disposed about said first axis;
   (c) a rotating member including at least three internal ring-gears coaxially and rigidly coupled to each other, said rotating member connected to said first shaft wherein said rotating member is rotatable about a second axis parallel to and off-set from said first axis and orbiting about said first axis when said first shaft rotates, whereby a rotating motion of said first shaft produces an orbiting motion of said rotating member about said first axis;
   (d) a first gear nonrotatably mounted on said second shaft, said first gear disposed within and engaging one of said at least three internal ring-gears; and
   (e) at least two gears rotatably mounted on said second shaft, each of said at least two gears including a brake means for restraining from rotation, each of said at least two gears disposed within and engaging each of said at least three internal ring-gears excluding said one of said at least three internal ring-gears.

2. An apparatus for transmitting power comprising in combination:
   (a) a first shaft rotatably and coaxially disposed about a first axis;
   (b) a second shaft rotatably and coaxially disposed about said first axis;
   (c) a rotating member including at least three internal friction-rings coaxially and rigidly coupled to each other, said rotating member connected to said first shaft wherein said rotating member is rotatable about a second axis parallel to and off-set from said first axis and orbiting about said first axis when said first shaft rotates, whereby a rotating motion of said first shaft produces an orbiting motion of said rotating member about said first axis;
   (d) a first friction roller nonrotatably mounted on said second shaft, said first friction roller disposed within and in contact with one of said at least three internal friction-rings in a friction drive relationship;
   (e) at least two friction rollers rotatably mounted on said second shaft, each of said at least two friction rollers including brake means for restraining from rotation, each of said at least two friction rollers disposed within and in contact with each of at least three internal friction-rings excluding said one of said at least three internal friction-rings in a friction drive relationship.

3. The combination as set forth in claim 2 wherein said friction drive relationship includes tapered cylindrical surfaces under a pressurized contact produced by spring bias means.

4. An apparatus for transmitting power comprising in combination:
   (a) a first shaft rotatably and coaxially disposed about a first axis;
   (b) a second shaft rotatably and coaxially disposed about said first axis;
   (c) a first internal ring-gear and a second internal ring-gear coaxially and rigidly coupled to one another, said first and second ring-gears connected to said first shaft wherein said first and second internal ring-gears are rotatable about a second axis parallel to and off-set from said first axis and orbiting about said first axis when said first shaft rotates, whereby a rotating motion of said first shaft produces an orbiting motion of said first and second internal ring-gears about said first axis;
   (d) a first gear nonrotatably mounted on said second shaft, said first gear disposed within said first internal ring-gear and engaging said first internal ring-gear
   (e) a second gear rotatably mounted on said second shaft, said second gear disposed within said second internal ring-gear and engaging said second internal ring-gear; and
   (f) a brake means for restraining said second gear from rotating.

5. An apparatus for transmitting power including in combination:
   (a) a first shaft rotatably and coaxially disposed about a first axis;
   (b) a second shaft rotatably and coaxially disposed about said first axis;
   (c) a first internal friction-ring and a second internal friction-ring coaxially and rigidly coupled to one another, said first and second internal friction-rings connected to said first shaft wherein said first and second internal friction-rings are rotatable about a second axis parallel to and off-set from said first axis and orbiting about said first axis when said first shaft rotates, whereby a rotating motion of said first shaft produces an orbiting motion of said first and second internal friction rings about said first axis;

(d) a first friction roller nonrotatably mounted on said second shaft, said first friction roller disposed within and in contact with said first internal friction-ring in a friction drive relationship;

(e) a second friction roller rotatably mounted on said second shaft, said second friction roller disposed within and in contact with said second internal friction-ring in a friction drive relationship; and (f) a brake means for restraining said second friction roller from rotating.

6. The combination as set forth in claim 5 wherein said friction drive relationship includes tapered cylindrical surfaces under a pressurized contact produced by spring bias means.

* * * * *